F. P. ROSBACK.
PERFORATING MACHINE.
APPLICATION FILED JAN. 2, 1914.

1,127,092.

Patented Feb. 2, 1915.

9 SHEETS—SHEET 3.

Witnesses:

Inventor:
Frederick P. Rosback,
By Dyrenforth, Lee, Chritton and Wiles
Attys.

F. P. ROSBACK.
PERFORATING MACHINE.
APPLICATION FILED JAN. 2, 1914.

1,127,092.

Patented Feb. 2, 1915.
9 SHEETS—SHEET 4.

Witnesses:
Inventor:
Frederick P. Rosback,
By Dyrenforth, Lee, Chritton and Wiles
Attys.

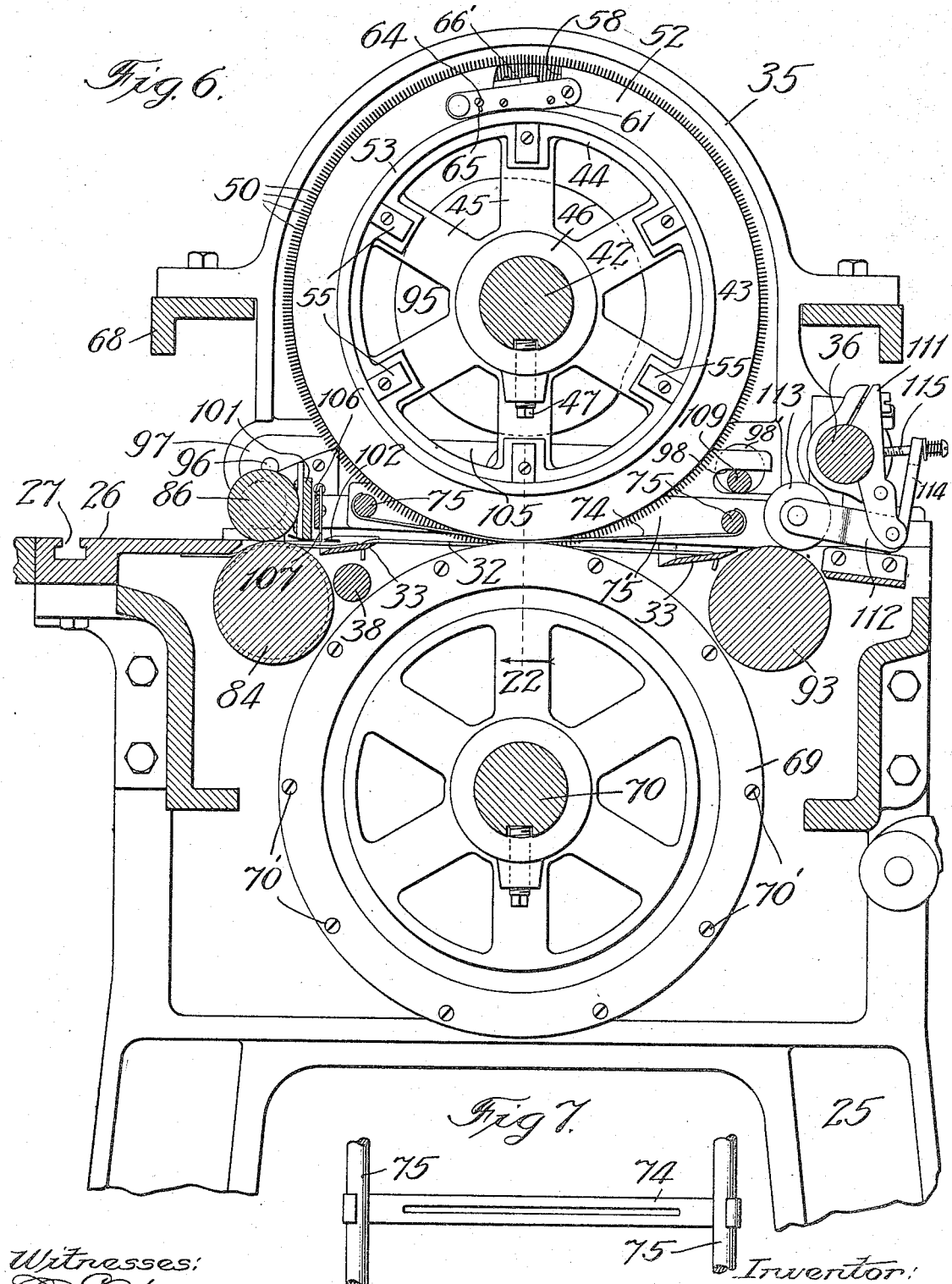

F. P. ROSBACK.
PERFORATING MACHINE.
APPLICATION FILED JAN. 2, 1914.

1,127,092.

Patented Feb. 2, 1915.

9 SHEETS—SHEET 6.

Witnesses:

Inventor:
Frederick P. Rosback,
By Dyrenforth, Lee, Chritton & Wiles,
Attys.

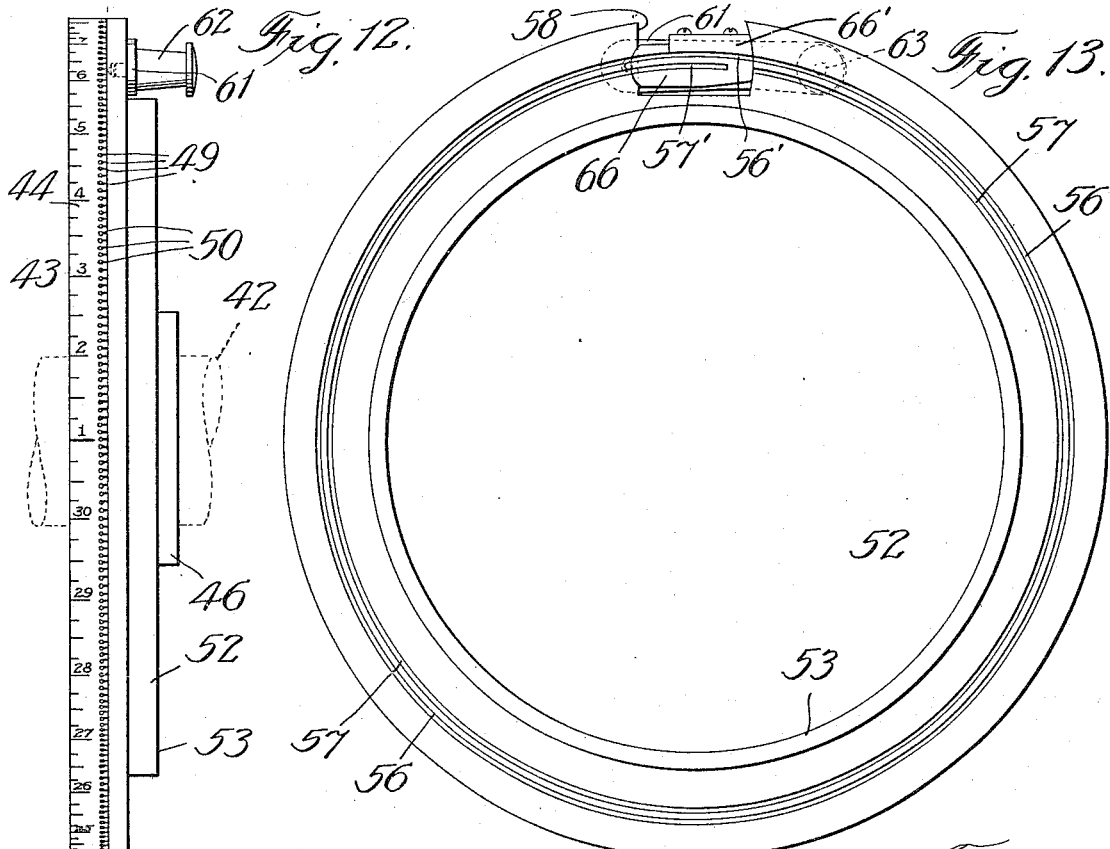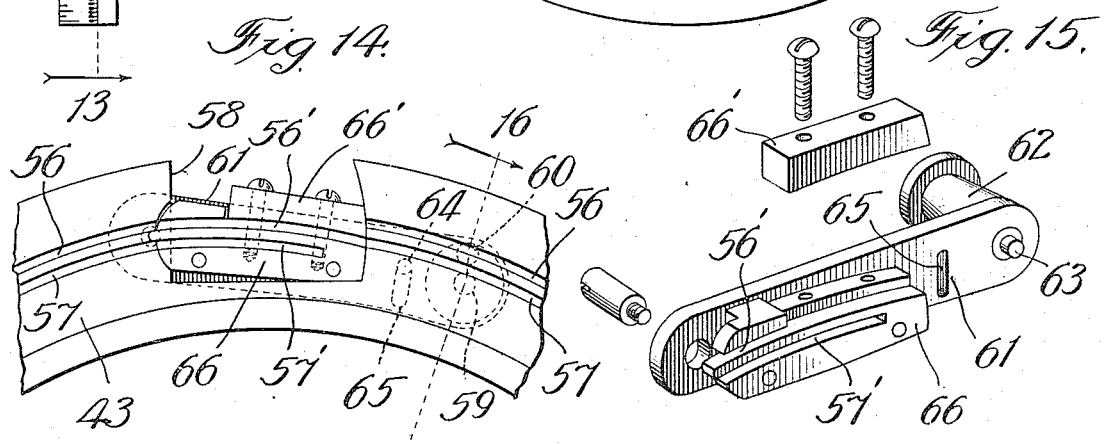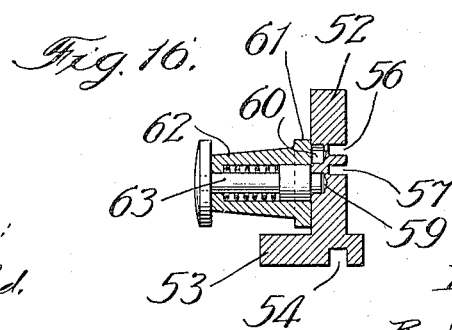

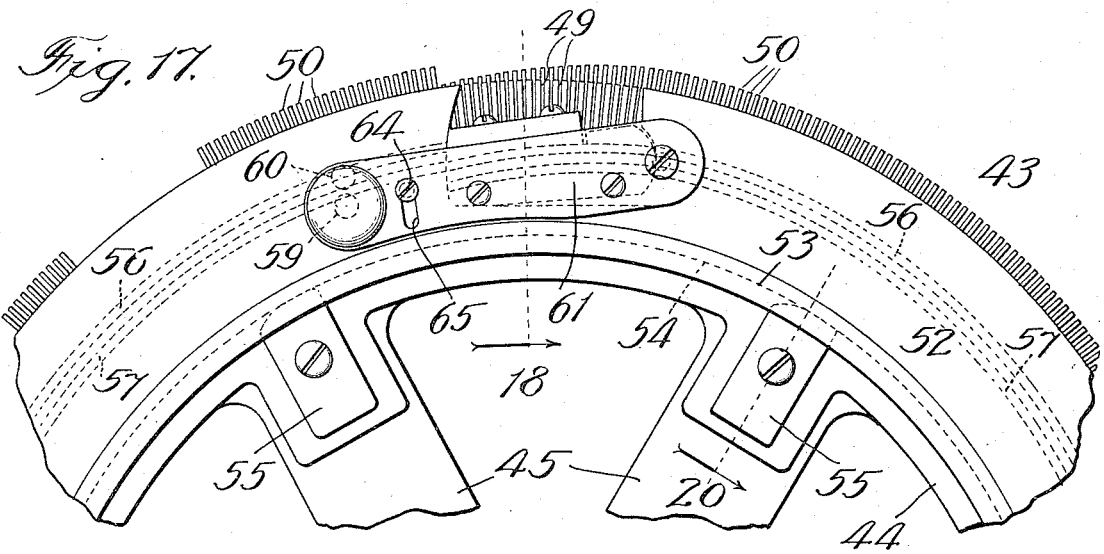
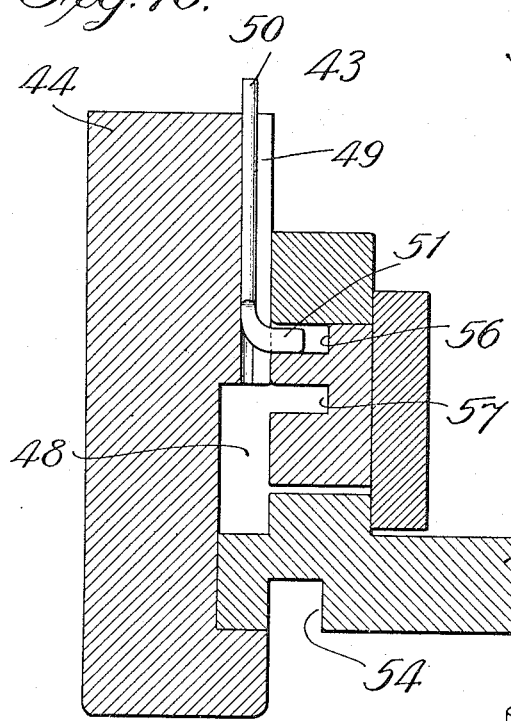
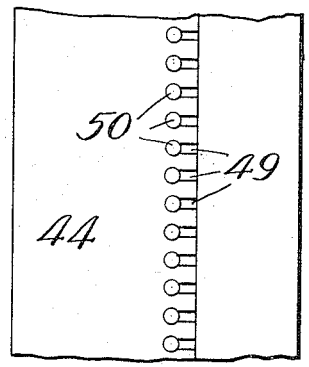
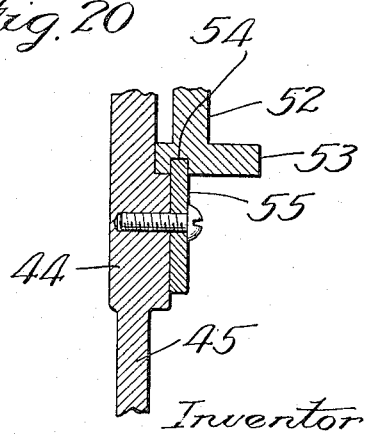
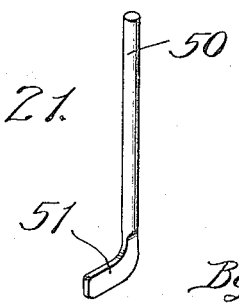

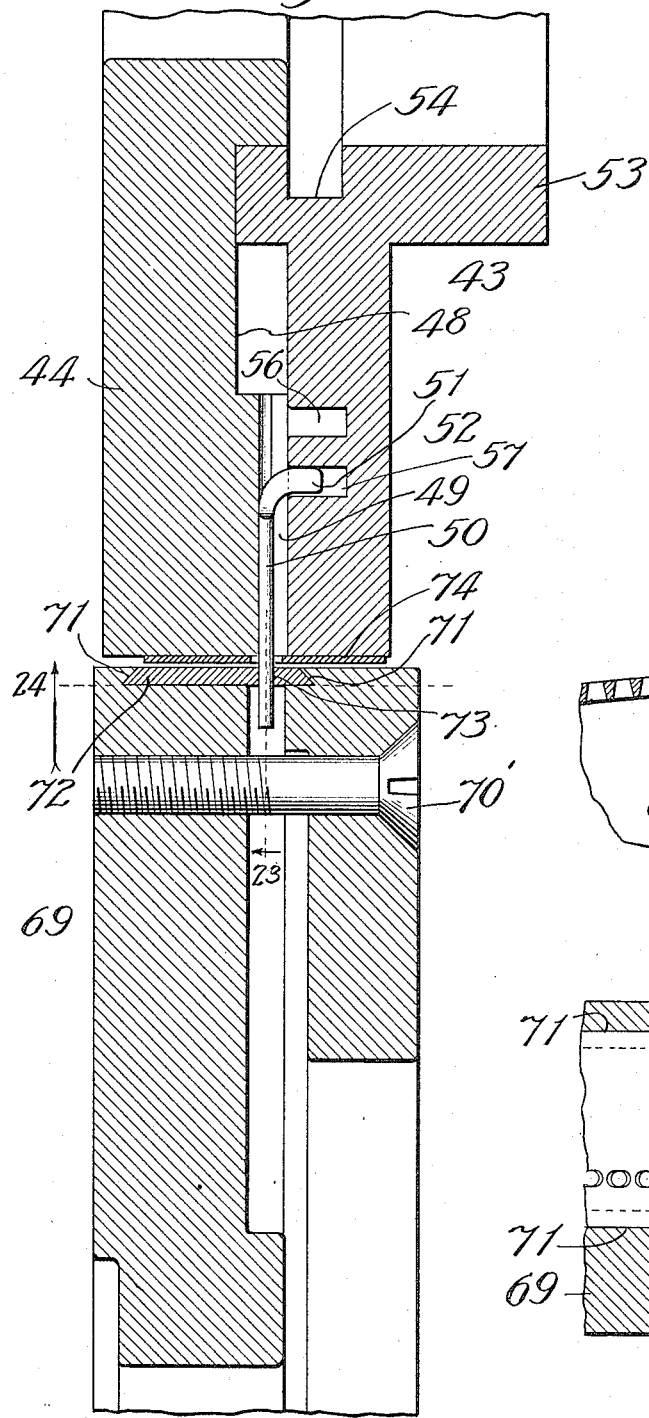
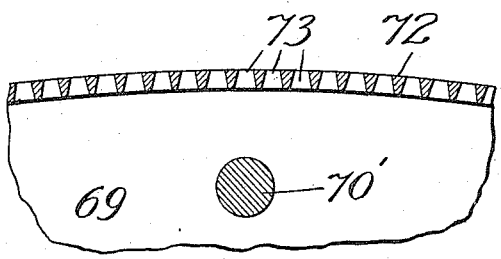
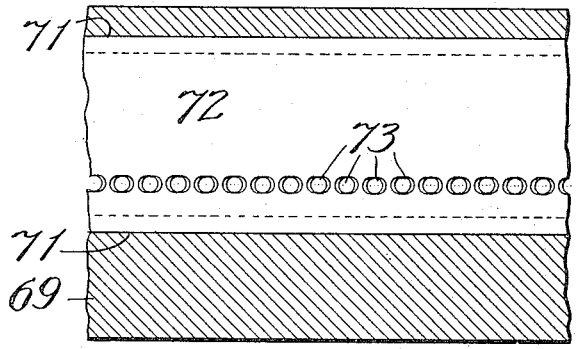

UNITED STATES PATENT OFFICE.

FREDERICK P. ROSBACK, OF BENTON HARBOR, MICHIGAN.

PERFORATING-MACHINE.

1,127,092.  Specification of Letters Patent.  Patented Feb. 2, 1915.

Application filed January 2, 1914. Serial No. 809,890.

*To all whom it may concern:*

Be it known that I, FREDERICK P. ROSBACK, a citizen of the United States, residing at Benton Harbor, in the county of Berrien and State of Michigan, have invented a new and useful Improvement in Perforating-Machines, of which the following is a specification.

My invention relates to an improvement in the class of machines for perforating sheets with lines of perforations, as for producing therein weakening lines to facilitate tearing, wherein the perforations are produced by punches projecting beyond the periphery of a circular vertically-rotating head to punch the sheet by a shearing cut in coöperation with female dies in a similar companion-head.

Figure 1:
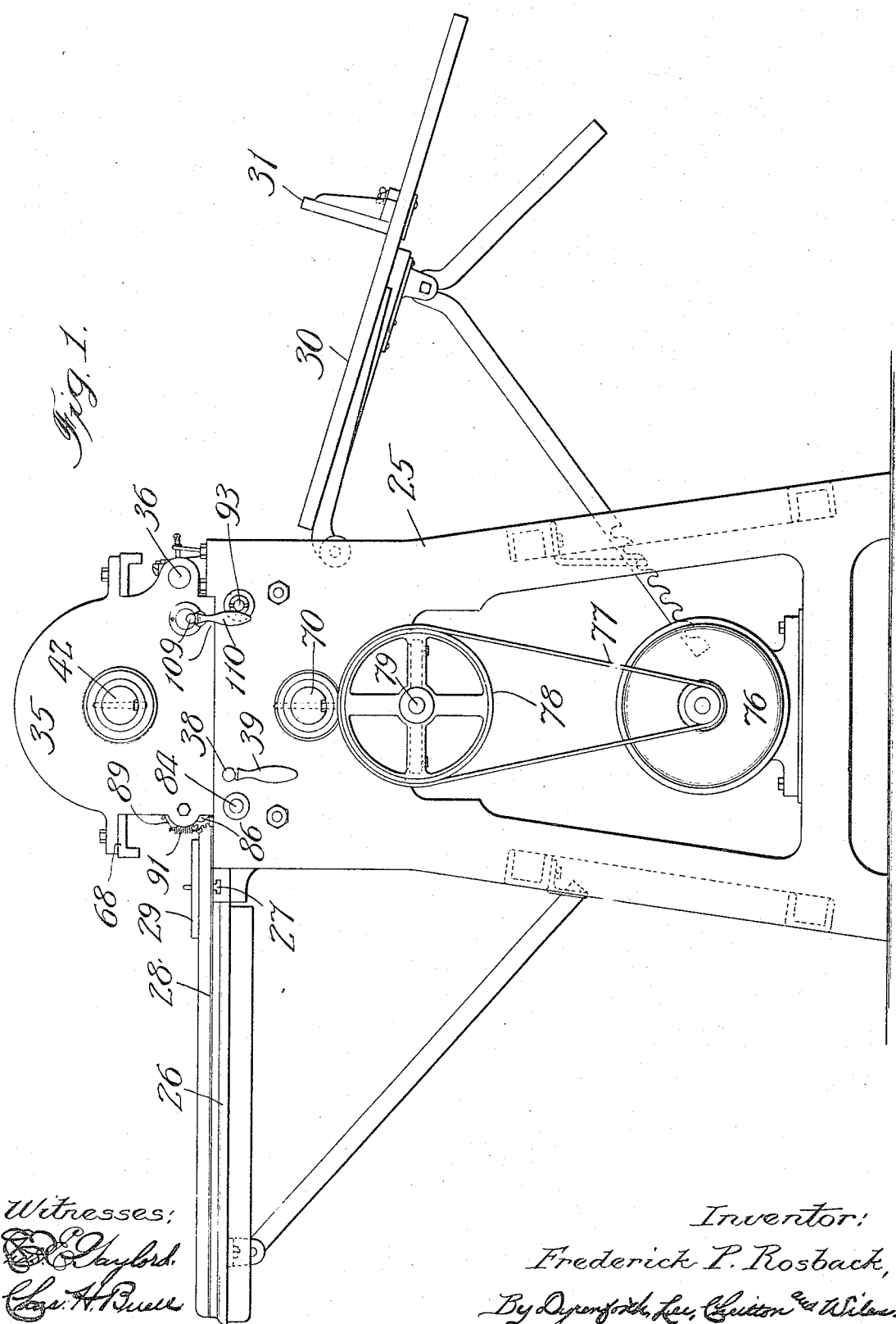
Figure 2:
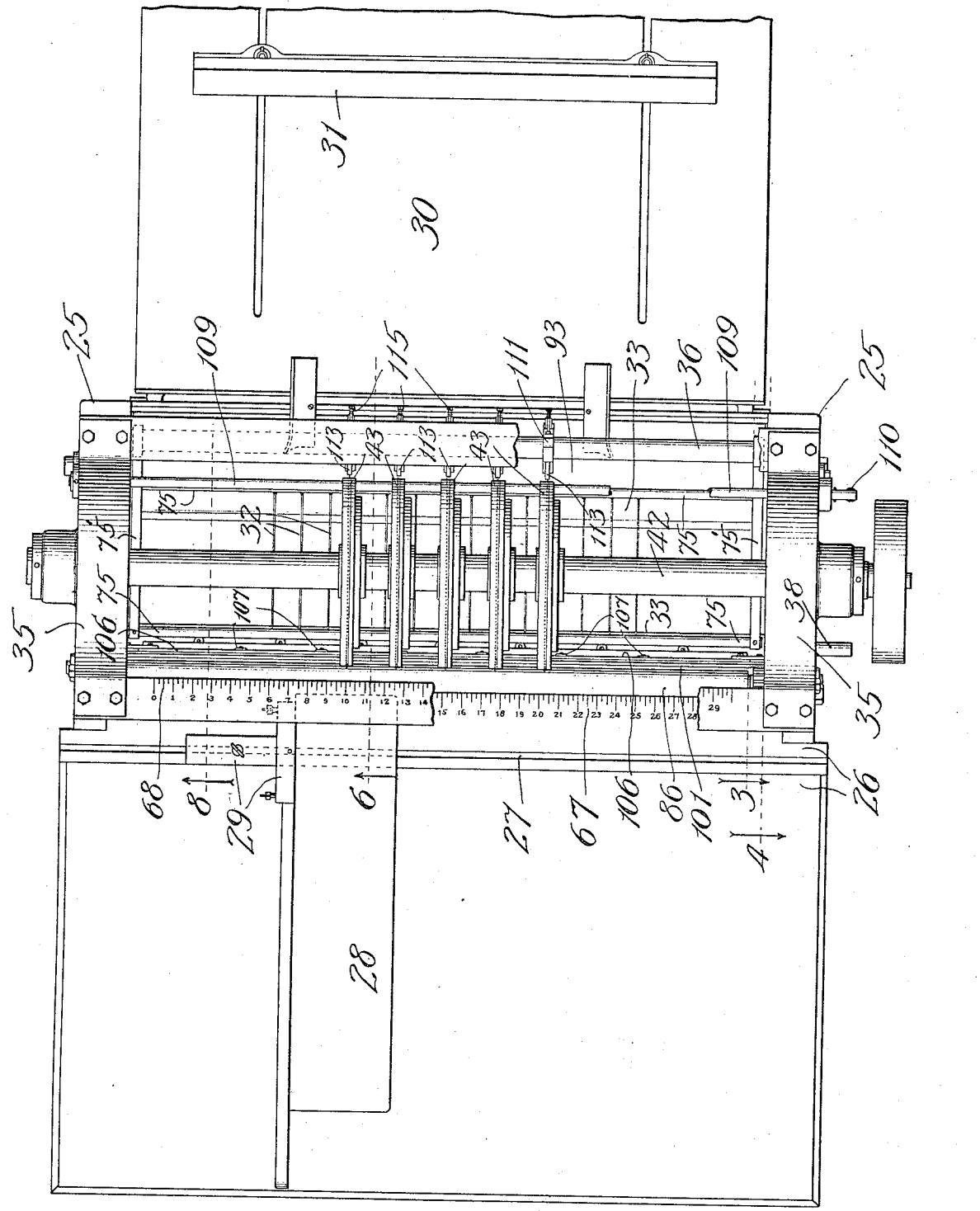
Figure 3:
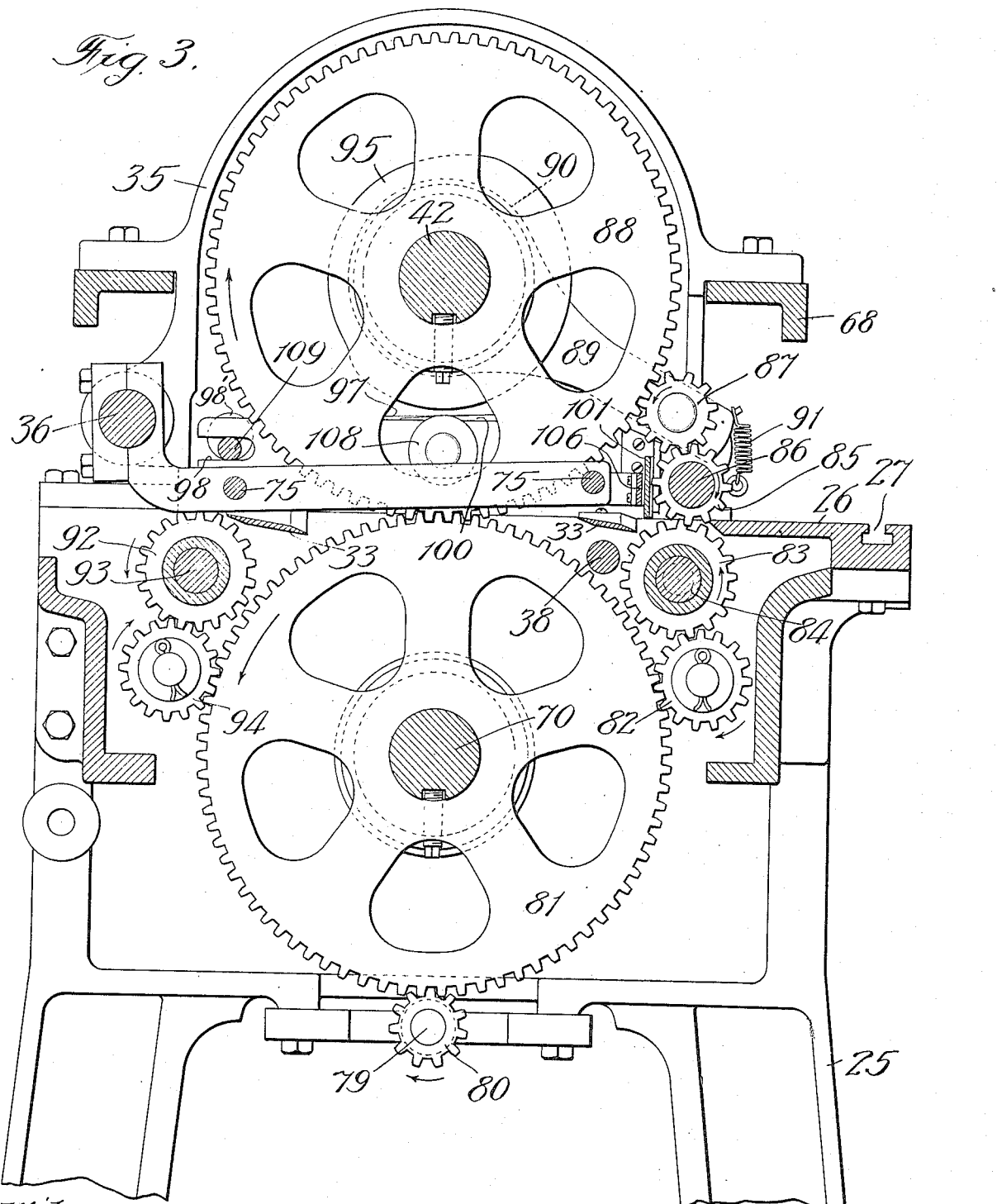
Figure 4:
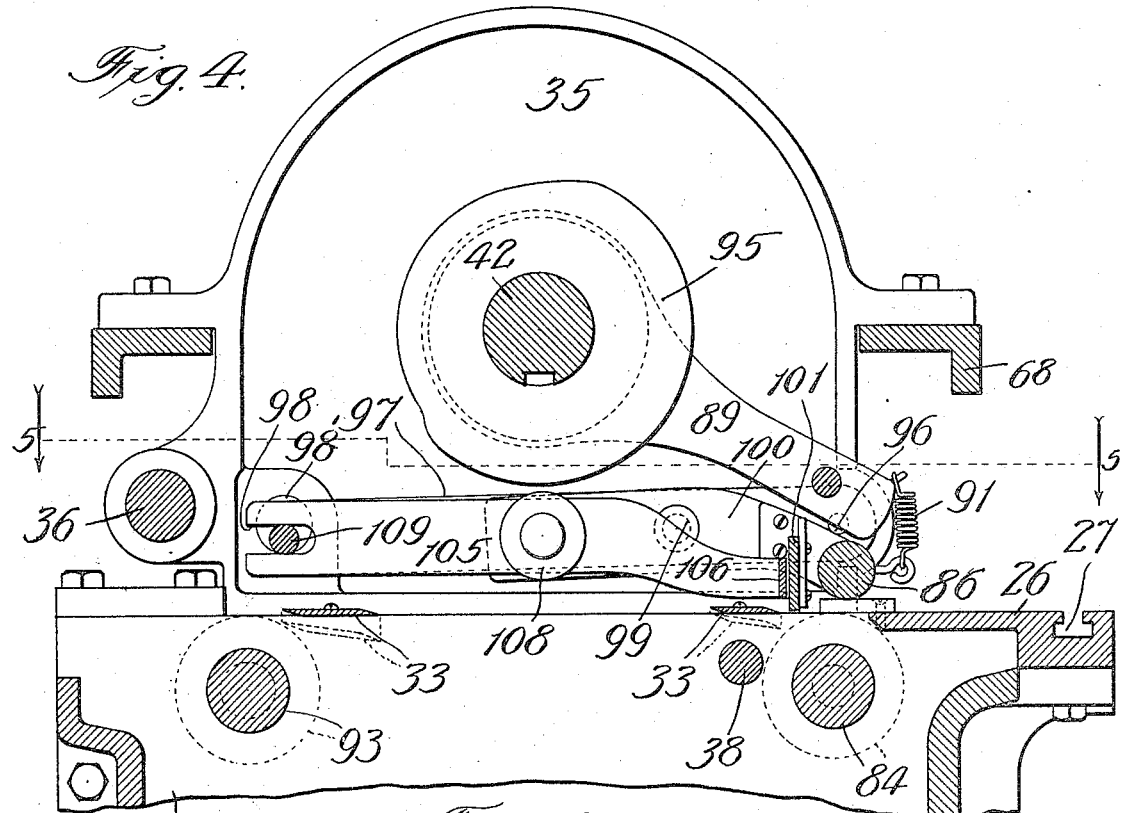
Figure 5:
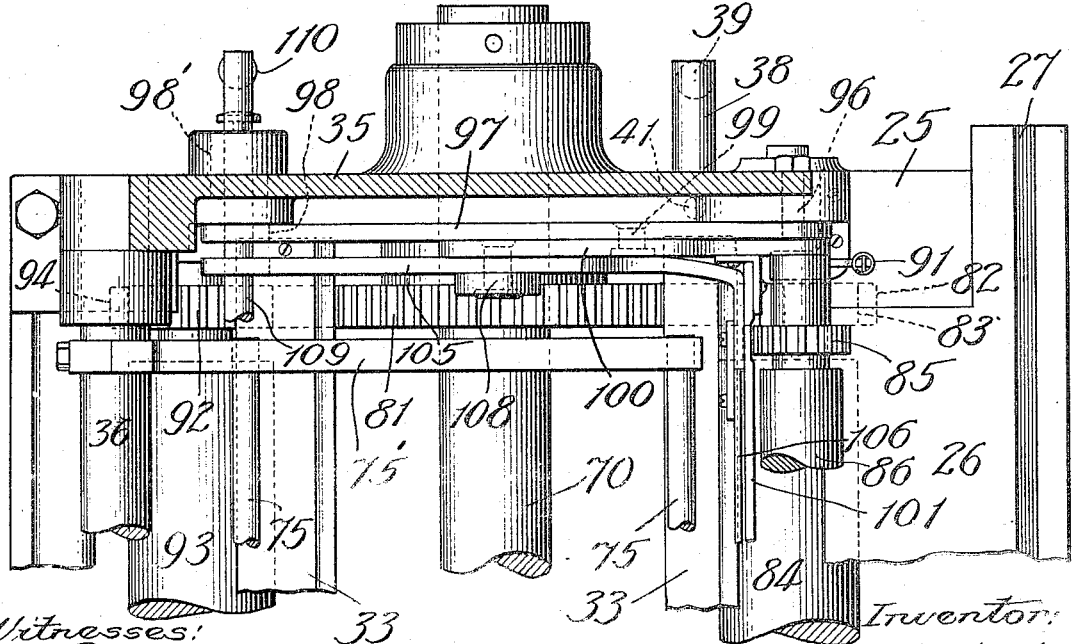
Figure 8:
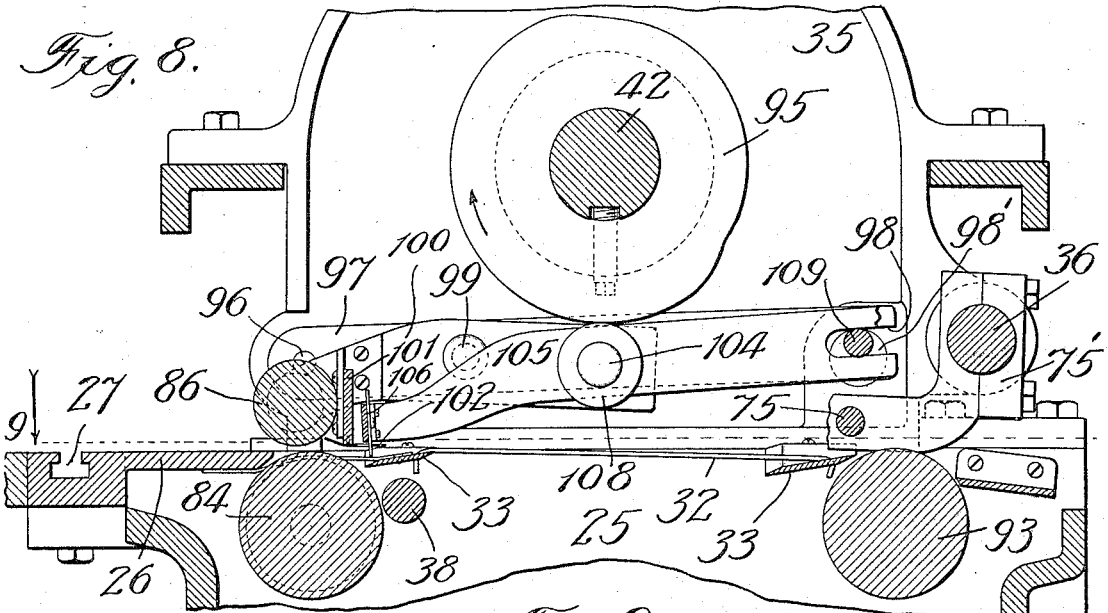
Figure 9:
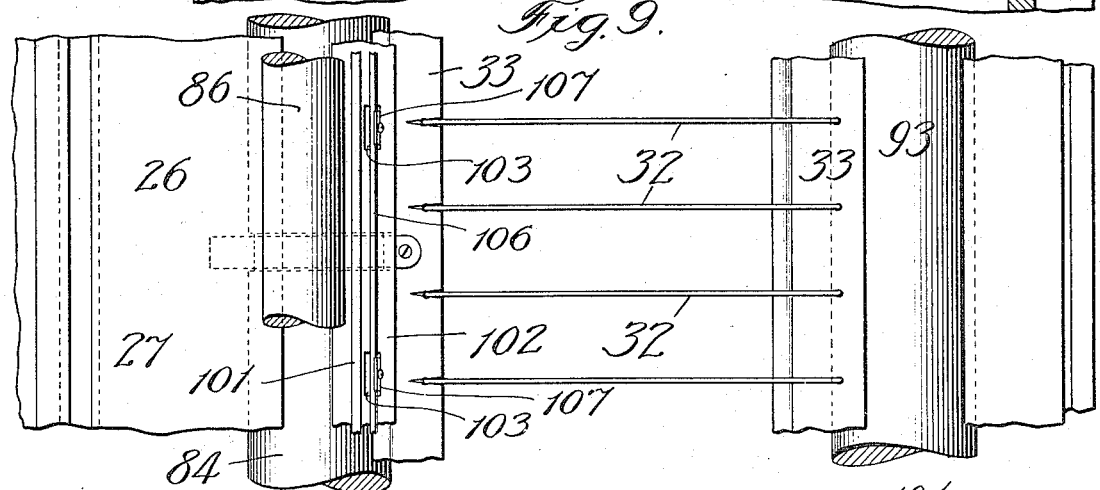
Figure 10:
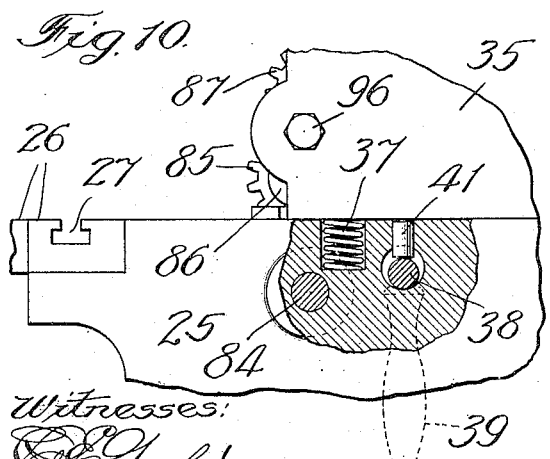
Figure 11:
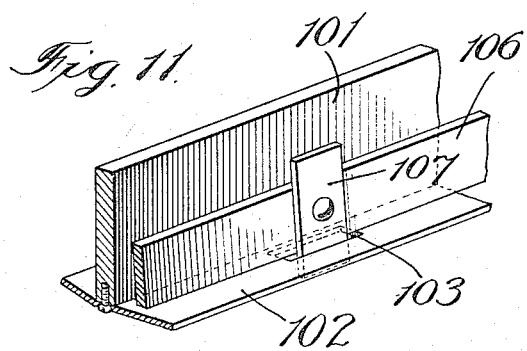

In the accompanying drawings, Figure 1 shows my improved machine by a view in side elevation; Fig. 2 is a broken plan view of the same; Fig. 3 is an enlarged section on line 3, Fig. 2; Fig. 4 is an enlarged broken view in section on line 4, Fig. 2; Fig. 5 is a broken view in section on the irregular line 5—5, Fig. 4; Fig. 6 is an enlarged section on line 6, Fig. 2; Fig. 7 is a broken view in plan, showing a stripper detail; Fig. 8 is an enlarged broken view in section on line 8, Fig. 2; Fig. 9 is a plan section on line 9, Fig. 8, showing the feed-rollers and the supporting-rods between them for the sheet; Fig. 10 is a broken view in side elevation of one of the two hinged head-forming cheeks surmounting the frame and in which the perforator-head shaft is journaled; Fig. 11 is a broken perspective view showing a stop-finger detail; Fig. 12 is a view in edge-elevation of one of the several similar perforator-heads; Fig. 13 is an inner-face view, on line 13, Fig. 12, of the rotatable ring-member of a perforator-head, showing the two concentric circular punch-holding grooves therein and the switch-device for withdrawing and protruding the punches; Fig. 14 is an enlarged broken view of the ring, showing the switch in its inner or shifted position; Fig. 15 is a perspective view of the switch, showing its parts in unassembled relation; Fig. 16 is a section on line 16, Fig. 14, showing the means for turning and releasably locking the switch; Fig. 17 is a broken view in side elevation of a perforator-head, showing it in full size; Fig. 18 is an enlarged section on line 18, Fig. 17; Fig. 19 is a broken face view of a perforator-head; Fig. 20 is a section on line 20, Fig. 17, showing a broken portion of the perforator-head and the means employed for releasably fastening the ring rotatably in place; Fig. 21 is an enlarged view in elevation of one of the many similar punches; Fig. 22 is an enlarged section on line 22, Fig. 6; Fig. 23 is a broken view of an enlarged section on line 23, Fig. 22, and Fig. 24 is a broken view of a section on line 24, Fig. 22, showing the holes in the female-die head, through which the punches work.

The frame of the machine is shown to be formed of two similar side-members 25 suitably secured rigidly together and braced in parallel spaced relation. At one side of the upper end of the frame is provided an adjustable feed-table 26 near the inner edge of which is a transverse groove 27 for guiding a rectangular gage 28 along which sheets of paper to be perforated are fed to the perforators, hereinafter described, by guiding the edge of each sheet along the straight face of the vertical member of the gage. A T-shaped head 29 fits over this vertical member (Fig. 2), to which it is shown to be fastened by set-screws, and the stem embraces and is adjustably fastened by a set-screw working in the groove 27, affording means for setting the gage on the table to adjust the sheet with reference to the perforator-heads as and for the purpose hereinafter explained. From the opposite side of the frame extends a hingedly adjustable table 30, on which the perforated sheets are delivered and piled against an adjustable stop 31. The path of the sheets between the frame-members is formed by sheet-supporting rods 32 extending between opposite parallel bars 33.

On the upper ends of the frame-members 25 is a head forming the upper part of the frame and comprising corresponding cheeks 35 connected by a hinge-rod 36 in suitable bearings near its ends, as shown; and these cheeks, which carry the shaft of the perforator-heads, seat against cushioning-springs 37 (Fig. 10) let into the upper ends of the frame-members. To raise the cheeks, for access to the perforator-heads, a rod 38 carrying a handle 39 and journaled in the opposite frame-members, is provided in each journal-portion with a reduced section forming a recess 40 in which rests a pin 41 to reciprocate vertically in the respective frame-member and bear against the lower edge of the adjacent cheek near its free edge. By turning the handle 39 in one direction, the pins 41 are elevated to raise the cheeks and parts carried by them, and to seat the cheeks into normal position the handle is turned in the opposite direction.

A shaft 42 is journaled centrally in the opposite cheeks and carries similar perforator-heads 43, of which five are shown in Fig. 2, though the number employed will be according to desire or requirement. The perforator-head, which is the principal feature of my present invention, involves the following described construction.
A circular member 44 (Fig. 6) is shown in its preferred form of a wheel with spokes 45 radiating from a central hub 46, at which the wheel is adapted to be adjustably fastened to the shaft 42 by a set-screw 47.
This member is provided about its inner face with a circular recess 48 (Figs. 18 and 22), and across the raised surface of the wheel, which is toward the periphery of the wheel, are formed, equidistant apart, narrow slits 49, having cylindrical bases and straight walls, in which are reciprocably confined punches 50 having their inner ends bent and flattened to form heads 51 for the purpose hereinafter explained. The punches are only about one thirty-second of an inch in diameter, in the present machine, and they fit to be reciprocably confined in the slits 49, which extend in an endless series about the face of the wheel. The other member 52 of the perforator-head is shown in its preferred form of a ring provided about the opening with an annular flange 53 and with a circumferential groove 54 (Fig. 20) in the wall about the annular opening to receive tongues 55 pivotally carried on the spokes 45 for connecting the ring-member rotatably to the member 44, face to face. The inner face of the ring is provided with two concentric annular grooves 56 and 57 in close proximity to each other. In the periphery of this ring-member is provided a recess 58, beyond one end of which are formed, in the outer face of the ring, an inner socket 59 and an outer socket 60 (Fig. 16). A switch-device works in the recess 58 and is of the construction most clearly shown in Fig. 15 and described as follows:

An arm 61 is pivotally fastened at one end to the face of the ring 52, adjacent to an end of the recess therein, and carries on its opposite end a hollow handle 62 containing a spring-pressed plunger 63 to withdrawably enter the socket 59 or the socket 60; and in turning this arm, it is guided by a pin 64 projecting from the outer face of the ring-member into a slot 65 provided in the inner edge of the arm. From the inner face of the arm 61 projects a shoe 66, which fits between the ends of the recess to turn therein by turning the arm; and this shoe contains an arc-shaped inner blind groove 57', to register at its open end permanently with the groove 57, and a similarly-shaped outer groove 56' to register at one end permanently and at its opposite end normally with the groove 56. A block 66' (Fig. 15) is fastened in place by screws to adapt it to be taken off for removing punches out of the groove 56', as for repairing them.

The punches are contained in the radial slits 49 with the heads of all of them normally confined in the outer ring-groove 56, and are all of the same length which protudes them in that position, for perforating, uniformly from the periphery of the head 43. When it is desired to withdraw from action any number of the punches, this may readily be done at any point in the circumferential series thereof by withdrawing the plunger 63 from its retaining-socket 60 to free the arm 61, then turning the arm to lock it by registering the plunger and introducing it into the inner socket 59. This movement of the arm moves the switch-shoe to bring its groove 56' into the position of connecting the groove 56 with the inner groove 57. Thereupon, by turning the ring, the switch will direct the punch-heads through it into the inner ring-groove 57, thereby withdrawing the punches so acted upon from protrusion and therefore from action. When it is desired, on the other hand, to protrude punches from the withdrawn into their acting position, the ring is turned to bring the switch into position to enter the heads of the punches to be protruded into the shoe-groove 56', when the arm is unlocked and turned outwardly to its other locking position, thereby correspondingly turning the shoe and protruding the punches the heads of which are confined in that groove.

The more usual purpose of the provision for withdrawing the punches is to provide skips, which are ordinarily of uniform length, in the circumferential series to adapt the head, in rotating, to punch the series of perforations at intervals in the sheet; though the means provided for the withdrawal enables one or more of the punches to be withdrawn and retained in the withdrawn position at any desired intervals. Of course, moreover, as will be understood, when the punches are all protruded into their normal or operative position, the head will perforate continuously.

The heads 43 are adjustably secured on the shaft 42 in desired number at required distances apart. For a sheet to be perforated, the gage 28 is adjusted on the table 26 with reference to a scale 67 marked off on the table in inches and fractions of an inch. A similar scale is provided at 68 above the scale 67, being supported at its ends on the cheeks 35, for guidance in adjusting the perforator-heads on their shaft. Thus, if a sheet is to be perforated with the first row of perforations along a line, say, three inches removed from one edge, the gage 28 will be adjusted by guidance of the scale 67, and the first head 43 will be adjusted by guidance of the scale 68 three inches away; and the remaining heads will be adjusted, under the same guidance, at such distances apart as they are required to produce lines of perforations in the sheet.

Each head 43 coöperates with a circular head 69, shown in its preferred general wheel-form (Fig. 6) directly below it and adjustably mounted on a shaft 70 journaled in the frame-members 25. The head 69 is formed, like the head 43, of two circular members. These members are secured together, face to face in spaced relation, by screws 70' and have corresponding dovetailed recesses 71 in their peripheries to clench therein between the members an annular band 72. This band contains, coincidently with the space between the two head-forming members, a circumferential series of holes 73, circular at their outer ends, from which they flare inwardly, as shown in Fig. 23. The holes register with the punches 50 for the latter to work through them in perforating, and they operate as female dies to produce shearing perforation of the punches. The inwardly flaring shape of the holes 73 prevents binding therein of the punches in withdrawing therefrom by the rotation of the respective head 43. Between each pair of heads 43 and 69 extends a slotted plate 74 (Fig. 7) forming a stripper, through the slot in which the punches work. These plates extend at proper intervals between horizontal rods 75 supported in opposite bars 75' clamped on the hinge-rod 36.

For driving the shafts 70 and 42 an electric motor, indicated at 76 in Fig. 1, may be employed, having a belt-connection 77 with a pulley 78 on a stub-shaft 79 journaled in a bearing secured on a frame-member 25 and carrying a pinion 80. The pinion 80 drives a gear-wheel 81 on the shaft 70, meshing with a similar gear 88 on the shaft 42 to drive the latter. The gear 81 drives an idler-pinion 82, which drives a relatively-larger pinion 83 on a trunnion of the lower feed-roller 84 extending adjacent to the advance edge of the feed-table 26, and the same gear drives an idler-pinion 94, which drives a pinion 92 on the adjacent end of a delivery-roller 93. The gear 88 meshes with a pinion 87 supported on a stem 89 extending from a collar 90 about the shaft 42 and held yieldingly by a coiled spring 91 to maintain the pinion 87 in mesh with a pinion 85 on the upper feed-roller 86 to drive it.

On the shaft 42, near each end thereof, is carried to rotate with it a cam 95. Below each cam is pivoted, near one end at 96, a bar 97 to extend across the machine from its feed to its delivery side, the bar being slotted, as shown at 98, in its distal end. To the inner face of each bar, near its pivot, is pivoted on a stud 99 a relatively-short arm 100, and the two corresponding arms are joined together by a connecting-bar 101 having a base-plate 102 (Fig. 11) secured to it and containing openings 103 at intervals. The upper feed-roller 84 is journaled in the ends of the arms 100 to coöperate with the roller 84. At 104 is pivoted to each arm 100, near its end, a curved relatively-long arm 105 slotted in its distal end to register with the slot 98, and these two arms are rigidly connected together at their outer ends by a bar 106 extending lengthwise over a wing of the base-plate 102 and carrying, at intervals corresponding with those of the recesses in the base-plate, stop-tongues 107. On each pivot 104 is a roller 108 to be engaged by the respective cam 95. A rock-shaft 109 is journaled in the opposite cheeks 35 near the delivery side of the machine and passes through the slots 98; and this rock-shaft, which has eccentric journals 98' on its ends, carries on one end an operating handle 110. The hinge-pintle 36 of the cheeks 35 carries (Fig. 6), at intervals, brackets 111, to the lower ends of which are pivoted forks 112 having burring-rolls 113 journaled in them to bear on and coöperate with the delivery-roller 93. Each fork has an upwardly-extending finger 114 on its pivoted end, in which works a spring-pressed set-screw 115 to bear against the respective bracket 111 for adjusting the pressure of the bur-roll against the delivery-roller. The brackets are adjustable on the rod 36 to register each roll 113 with a head 43, in which position it is adapted to flatten down any burs or ragged edges produced by the punches in perforating a sheet.

The operation is as follows: With the machine in operation, sheets to be perforated are fed in succession along the gage 28 on the table 26 to the feed-rollers. If each line of perforations is to be uninterrupted, all the punches on each head 43 are protruded in continuous series about it. Then, moreover, the handle 110 is manipulated to turn the rock-shaft 109 for lowering the adjacent ends of the bars 97 from their elevated position, represented in Fig. 8, wherein the rollers 108 are in the paths of the cams, to the position represented in Fig. 4, wherein those rollers are out of the cam-paths. In the last-named, depressed position of the bars 97, by reason of the pivot-stud connections of the arms 100 with the bars, the upper feed-roll 86 is held in raised position, out of coöperating relation with the lower feed-roll 84, and the pivot-connections 104 of the arms 105 cause the latter to be raised with the arms 100 to hold up the bar 106 and the stop-fingers 103 out of the path of feed of the sheets, so that the latter may be fed, one after the other in succession, through the machine to be perforated by the rotating heads 43 and 69, the strippers 74 in the meantime performing their function, and the sheets being delivered between the rollers 93 and 113 to drop and pile upon the delivery-table 30 against the stop 31.

Where the punches are protruded, by using the switch, as described, to cause them to perforate in sets at intervals along the sheet, thus by skips, the arrangement of the parts is such as to require the shaft 42 to make a complete revolution for each feed of a sheet to be perforated. To this end, the shaft 109 is turned, to the position shown in Fig. 8, to raise the adjacent ends of the pivotal bars 97 and thereby bring the rollers 108 into the paths of the cams. In the rotation of the shaft 42 the lower cam-sections produce the feeding of the sheets to the perforating heads and the higher cam-sections raise the upper feed-roller and keep it raised and at the same time cause the stops 103 to obstruct the path of the feed to a succeeding sheet to be perforated. Thus, when the lower cam-sections bear against the rollers 108, the feed-roller 86 is depressed into its coöperative relation to the companion-roller 84, and the arms 105 and bar 106 are raised to hold the stops 103 above the path of feed. When the higher cam-sections bear against the rollers 108, they raise the upper feed-roller out of action and lower the arms 105 with the bar 106, thereby bringing the stops into position to obstruct the feed of a succeeding sheet, which, however, may be adjusted on the feed-table against them, ready to be acted on when the upper feed-roller is depressed and the stops are raised by the lower cam-sections being again brought to the rollers. In this way the feeding of the successive sheets is produced at regular intervals, and it is impossible for one sheet to overtake another.

About the periphery of each head is provided, as shown in Fig. 12, a scale marked off in inches, from 1 to 30, and fractions of an inch. This scale is used for coöperation with the switch for measuring the width of a line of punches to be withdrawn from action. In using it, the number "1" is regarded as the starting point, which is brought to the view of the person making the adjustment, and bears at all times a certain relation to the cams; and the switch is then set to its punch-withdrawing position, when the ring is rotated to the extent for effecting withdrawal of the number of punches within the limits on the scale between the number "1" and the number denoting the predetermined extent of punches to be withrawn.

I realize that considerable variation is possible in the details of construction thus specifically shown and described, and I do not intend by illustrating a single, specific or preferred embodiment of my invention to be limited thereto; my intention being in the following claims to claim protection upon all the novelty there may be in my invention as broadly as the state of the art will permit.

What I claim as new and desire to secure by Letters Patent is:—

1. A perforator-head for a perforating machine, having punches in circumferential series about it, and means on the head for positively withdrawing into it and rigidly withholding any desired number of the punches and protruding them therefrom into and securing them in perforating position.

2. A perforator-head for a perforating machine, having punches in circumferential series about it, and rotatable switching-means on the head for positively withdrawing into it and rigidly withholding any desired number of the punches and protruding them therefrom into and securing them in perforating position.

3. A perforator-head for a perforating machine, comprising a member provided on one face with a circumferential series of slits, headed punches reciprocably confined in the slits, a second member rotatably connected, face to face, with said first-named member and having concentric grooves in its inner face to receive the punch-heads, and a switch-device on said second member having a pair of grooves to normally register, respectively, with said concentric grooves and register one end of its outer groove with the adjacent end of the inner concentric groove by turning the switch.

4. A perforator-head for a perforating machine, comprising a member provided on one face with a circumferential series of slits, headed punches resiprocably confined in the slits, an annular member rotatably connected, face to face, with said first-named member and having concentric grooves in its inner face to receive the punch-heads, a peripheral recess in the annular member, and a switch-device pivotally supported in said recess to be interposed in said grooves and having a pair of grooves to normally register, respectively, with said concentric grooves and register one end of its outer groove with the adjacent end of the inner concentric groove by turning the switch.

5. A perforator-head for a perforating machine, comprising a circular member provided on one face with a circumferential series of radial slits having cylindrical bases, punches reciprocably confined in said slit and having bent, head-forming inner ends, a second member rotatably connected, face to face, with said first-named member and having concentric grooves in its inner face to receive the punch-heads, and a switch-device on said second member having a pair of grooves to normally register, respectively, with said concentric grooves and register one end of its outer groove with the adjacent end of the inner concentric groove by turning the switch.

6. A perforator-head for a perforating machine, comprising a circular member provided on one face with a circumferential series of radial slits, headed punches reciprocably confined in the slits, a second circular member rotatably connected, face to face, with said first-named member and having concentric grooves in its inner face to receive the punch-heads, said second member having a peripheral recess and inner and outer sockets in its outer face near one end of said recess, and a switch-device having an arm pivotally fastened to said second member near one end of said recess and provided on its opposite end with a handle containing a spring-pressed plunger to enter said sockets, and a shoe in said recess on the inner face of the arm, containing a pair of grooves to normally register, respectively, with said concentric grooves and register one end of its outer groove with the adjacent end of the inner concentric groove by turning the arm inwardly.

7. A perforator-head for a perforating machine, comprising a wheel-like member provided with a circumferential series of radial slits on one face and with pivotal tongues at intervals, headed punches reciprocably confined in said slits, an annular member having an inner circumferential groove to receive said tongues for connecting the annular member face to face and rotatably with the wheel-like member, the annular member having a peripheral recess and concentric grooves in its inner face to receive the punch-heads, and a switch-device working in said recess, having a pair of grooves to normally register, respectively, with said concentric grooves and register one end of its outer groove with the adjacent end of the inner concentric groove by turning the switch.

8. A perforating machine comprising, in combination, a frame, a shaft journaled in the frame and carrying a circular head provided with a circumferential series of punches, a second shaft journaled in the frame and geared to the first-named shaft, a circular head on the second shaft having about its periphery, to coöperate with the punches, a circumferential series of inwardly-flaring punch-receiving holes, and means for driving said shafts.

9. A perforating machine comprising, in combination, a frame, a shaft journaled in the frame and carrying a circular head provided with a circumferential series of punches, a second shaft journaled in the frame and geared to the first-named shaft, a circular head on the second shaft formed of two members secured together in spaced relation and confining between them in the periphery a band provided with a circumferential series of inwardly-flaring holes to coöperate with the punches, and means for driving said shafts.

10. A perforating machine comprising, in combination, a frame, a shaft journaled in the frame and carrying a circular head provided with a circumferential series of punches, a second shaft journaled in the frame and geared to the first-named shaft, a circular head on the second shaft formed of two members secured together in spaced relation and provided with corresponding dove-tailed recesses in their peripheries, an annular band clamped between the members in said recesses and provided with a circumferential series of inwardly-flaring holes to coöperate with the punches, and means for driving said shafts.

11. A perforating machine comprising, in combination, frame-forming side-members having a shaft journaled therein and carrying a circular head provided with peripheral punch-receiving holes, a head hingedly supported on the upper ends of said frame-members, a shaft journaled in said head and carrying a circular head provided with punches to coöperate with said holes, said shafts being geared together, and means for driving said shafts.

12. A perforating machine comprising frame-forming side-members having a shaft journaled therein and carrying a circular head provided with peripheral punch-receiving holes, a pair of head-forming cheeks hingedly supported on the upper ends of said frame-members, a shaft journaled in said cheeks and carrying a circular head provided with punches to coöperate with said holes, said shafts being geared together, cushioning springs for the cheeks in the upper ends of said frame-members, a shaft journaled in said frame-members containing recesses in the journals and provided with a handle, pins alining with said recesses and working in the upper ends of the frame members against the under sides of said cheeks, and means for driving said shafts.

13. A perforating machine comprising, in combination, a frame, an upper shaft journaled in the frame and carrying adjustably at intervals circular heads provided with circumferential series of punches, a scale on the frame for guiding the adjustment of said heads, a lower shaft journaled in the frame, geared to the upper shaft and carrying adjustably at intervals circular punch-receiving heads, feed-rollers on the frame, a feed-table provided with a gage for directing sheets to be perforated to said rollers, a scale on the table corresponding with said first-named scale for guiding the adjustment of said gage, and means for driving said shafts.

14. A perforating machine comprising, in combination, a frame, an upper shaft journaled in the frame and carrying adjustably at intervals circular heads provided with circumferential series of punches, a scale on the frame extending parallel with and adjacent to said shaft for guiding the adjustment of said heads, a lower shaft journaled in the frame, geared to the upper shaft and carrying adjustably at intervals circular punch-receiving heads, feed-rollers on the frame, a feed-table having a guide slot in its forward edge, a gage having a T-shaped head connecting it adjustably with said slot for setting it, a scale on the forward end of said table for guiding the adjustment of the gage and corresponding with said first-named scale, and means for driving said shafts.

15. A perforating machine comprising, in combination, a frame, an upper shaft journaled in the frame and carrying at intervals circular heads provided with circumferential series of punches, a lower shaft journaled in the frame, geared to the upper shaft and carrying at intervals circular punch-receiving heads, feed-rollers on one side of the frame, a feed-table leading to the feed rollers, a delivery-roller on the opposite side of the frame, a delivery-table extending from the delivery-roller, burring rollers supported to coöperate with said delivery-roller and perforating-heads, parallel bars supported on the frame to extend, respectively, adjacent to the inner end of the feed-table and the inner end of the delivery-table, rods connecting said bars for supporting sheets being perforated while traveling between said perforating and punch-receiving heads, and means for driving said shafts.

16. A perforating machine comprising, in combination, a frame, an upper shaft journaled in the frame and carrying cams and between the cams a circular head provided with a circumferential series of punches, a lower shaft journaled in the frame, geared to the upper shaft and carrying a punch-receiving head, an upper feed-roller and stop-fingers adjacent thereto to extend into the path of feed of a sheet to be perforated, and means carrying said feed-roller and fingers operated by said cams in their rotation to alternately lower said feed-roller and simultaneously raise said fingers out of said path, and raise said feed-roller and simultaneously lower said fingers into said path, and means for driving said shafts.

17. A perforating machine comprising, in combination, a frame, an upper shaft journaled in the frame and carrying cams and between the cams a circular head provided with a circumferential series of punches, a lower shaft journaled in the frame, geared to the upper shaft and carrying a punch-receiving head, parallel bars pivoted at one end on the frame to extend across and between said shafts, arms pivoted between their ends to opposite faces of said bars and carrying a feed-roller and adjacent thereto a rigid connecting-bar provided with a base-plate containing slots at intervals, relatively-long arms pivoted between their ends to the opposing faces of said feed-roller-carrying arms and carrying on their pivots rollers coinciding with the cams, a bar connecting said last-named arms and carrying stop-fingers to work through said slots, and means for driving said shafts.

18. A perforating machine comprising, in combination, a frame, an upper shaft journaled in the frame and carrying cams and between the cams a circular head provided with a circumferential series of punches, a lower shaft journaled in the frame, geared to the upper shaft and carrying a punch-receiving head, parallel bars pivoted at one end on the frame to extend across and between said shafts, arms pivoted between their ends to opposite faces of said bars and carrying a feed-roller and adjacent thereto a rigid connecting bar provided with a base-plate containing slots at intervals, arms pivoted between their ends to opposite faces of said bars and carrying a feed-roller and adjacent thereto a rigid connecting-bar provided with a base-plate containing slots at intervals, relatively long arms pivoted between their ends to the opposing faces of said feed-roller-carrying arms and carrying on their pivots rollers coinciding with the cams, a bar connecting said last-named arms and carrying stop-fingers to work through said slots, a rock-shaft having eccentric end-journals at which it is supported in the frame to extend through slots in corresponding ends of said relatively-long arms and provided with an operating handle, and means for driving said upper and lower shafts.

FREDERICK P. ROSBACK.

In presence of—
  TEEN F. SMITH,
  FRED P. ROSBACK, Jr.